US010755820B2

(12) United States Patent
Galloway et al.

(10) Patent No.: US 10,755,820 B2
(45) Date of Patent: Aug. 25, 2020

(54) STRUCTURE FOR CONTAINMENT OF RADIATION FROM AN ICF

(71) Applicant: Innoven Energy, LLC, Colorado Springs, CO (US)

(72) Inventors: Conner D. Galloway, Colorado Springs, CO (US); Alexander V. Valys, Colorado Springs, CO (US); Robert O. Hunter, Jr., Aspen, CO (US); David H. Sowle, Santa Maria, CA (US)

(73) Assignee: INNOVEN ENERGY, LLC, Colorado Springs, CO (US)

( * ) Notice: Subject to any disclaimer, the term of this patent is extended or adjusted under 35 U.S.C. 154(b) by 978 days.

(21) Appl. No.: 15/412,767

(22) Filed: Jan. 23, 2017

(65) Prior Publication Data

US 2017/0229193 A1 Aug. 10, 2017

Related U.S. Application Data

(60) Provisional application No. 62/388,296, filed on Jan. 22, 2016.

(51) Int. Cl.
*G21B 1/03* (2006.01)

(52) U.S. Cl.
CPC .............. *G21B 1/03* (2013.01); *Y02E 30/14* (2013.01)

(58) Field of Classification Search
CPC .................................... G21B 1/03; G21B 1/17
USPC .................................................. 376/103, 150
See application file for complete search history.

(56) References Cited

U.S. PATENT DOCUMENTS

| 4,034,032 | A | 7/1977 | Hendricks |
| 4,525,323 | A | 6/1985 | Bangerter et al. |
| 2012/0002773 | A1* | 1/2012 | Hunter ..................... G21B 1/03 376/102 |
| 2013/0064340 | A1 | 3/2013 | Latkowski et al. |
| 2014/0044226 | A1 | 2/2014 | Campbell et al. |

FOREIGN PATENT DOCUMENTS

| GB | 2496250 A | 5/2013 |
| WO | 2011146113 A1 | 11/2011 |
| WO | 2017151237 A3 | 11/2017 |

OTHER PUBLICATIONS

Laser-Plasma Interactions in Long-Scale-Length Plasmas Under Direct-Drive National Ignition Facility Conditions, LLE Review, vol. 77, Jan. 2000, pp. 1-236.
Optimization of Deposition Uniformity for Large-Aperture NIF Substrates in a Planetary Rotation System, LLE Review, vol. 94, 2003, pp. 67-138.
Abdou et al., Critical Technical Issues and Evaluation and Comparison Studies for Inertial Fusion Energy Reactors, Fusion Engineering and Design, vol. 23, 1993, pp. 251-297.
(Continued)

*Primary Examiner* — Jack W Keith
*Assistant Examiner* — Daniel Wasil
(74) *Attorney, Agent, or Firm* — Kilpatrick Townsend & Stockton, LLP

(57) ABSTRACT

A method of using an ICF chamber may include causing a target in the ICF chamber to emit x-ray radiation; receiving the x-ray radiation through a plurality of holes in a wall of the ICF chamber; and absorbing the x-ray radiation in a gas contained in a plurality of tubes that are coupled to the plurality of holes.

7 Claims, 5 Drawing Sheets

(56) References Cited

OTHER PUBLICATIONS

Amendt et al., An Indirect-Drive Non-Cryogenic Double-Shell Path to 1ω Nd-laser Hybrid Inertial Fusion-Fission Energy, Nucl. Fusion, vol. 50, No. 10, 2010, pp. 1-4.
Amendt et al., Indirect-Drive Noncryogenic Double-Shell Ignition Targets for the National Ignition Facility: Design and Analysis, Physics of Plasmas, American Institute of Physics, vol. 9, No. 5, May 2002, pp. 2221-2233.
Amendt et al., Modified Bell-Plesset Effect with Compressibility: Application to Double-Shell Ignition Target Designs, Physics of Plasmas, vol. 10, No. 3, Mar. 2003, pp. 820-829.
Atzeni, 2-D Lagrangian Studies of Symmetry and Stability of Laser Fusion Targets, Computer Physics Communications, vol. 43, 1986, pp. 107-124.
Atzeni et al., Burn Performance of Fast Ignited, Tritium-Poor ICF Fuels, Nuclear Fusion, vol. 37, No. 12, 1997, pp. 1665-1677.
Atzeni et al., Fluid and Kinetic Simulation of Inertial Confinement Fusion Plasmas, Computer Physics Communications, vol. 169, 2005, pp. 153-159.
Azechi et al., Formation of Initial Perturbation of Rayleigh-Taylor Instability in Supernovae and Laser-Irradiated Targets—Is there any Similarity? The Astrophysical Journal Supplement Series, vol. 127, Apr. 2000, pp. 219-225.
Azechi et al., Model for Cannonball-Like Acceleration of Laser-Irradiated Targets, Japanese journal of Applied Physics, vol. 20, No. 7, Jul. 1981, pp. L477-L480.
Barrios et al., Electron Temperature Measurements Inside the Ablating Plasma of Gas-filled Hohlraums at the National Ignition Facility, Physics of Plasmas, vol. 23, 2016, pp. 056307-1-056307-7.
Bartel et al., Microfireballs in Stratified Target Chamber Gases in the Light Ion Target Development Facility, Final Report for the Period Sep. 9, 1983 to Sep. 30, 1985, Fusion Technology Institute, Sep. 1985, 24 pages.
Basko , A 6 MJ Spherical Hohlraum Target for Heavy Ion Inertial Fusion, Nuclear Fusion, vol. 39, No. 8, Aug. 1999, pp. 1031-1040.
Basko , An Improved Version of the View Factor Method for Simulating Inertial Confinement Fusion Hohlraums, Phys. Plasmas, vol. 3, No. 11, Nov. 1996, pp. 4148-4155.
Basko, New Developments in the Theory of ICF Targets, and Fast Ignition with Heavy Ions, Plasma Physics and Controlled Fusion, vol. 45, 2003, pp. A125-A132.
Bates et al., Simulations of High-Gain Shock-Ignited Inertial-Confinement-Fusion Implosions using Less than 1 MJ of Direct KrF Laser Energy, High Energy Density Physics, vol. 6, Issue 2, Dec. 3, 2009, 10 pages.
Betti, High-Z Ablator Targets for Direct-Drive Inertial Confinement Fusion, 54th Annual Meeting of the American Physical Society, Division of Plasma Physics, Oct. 29-Nov. 2, 2012, 15 pages.
Betti et al., Theory of the Deceleration Phase Rayleigh-Taylor Instability, 42nd Annual Meeting of the American Physical Society Division of Plasma Physics, Oct. 23-27, 2000, 17 pages.
Bodner, Critical Elements of High Gain Laser Fusion, Journal of Fusion Energy, Review Paper, vol. 1, No. 3, 1981, pp. 221-240.
Bodner et al., High-Gain Direct-Drive Target Design for Laser Fusion, Physics of Plasmas, 2000, pp. 1-5.
Bodner et al., Overview of New High Gain Target Design for a Laser Fusion Power Plant, Fusion Engineering and Design, vol. 60, 2002, pp. 93-98.
Boehly , The Evolution of Surface Defects Driven by Shock Waves, 54th Annual Meeting of the American Physical Society Division of Plasma Physics, Oct. 29-Nov. 2, 2012, 13 pages.
Booth et al., Prospects of Generating Power with Laser-Driven Fusion, Proceedings of the IEEE, vol. 64, No. 10, Oct. 1976, pp. 1460-1482.
Bose, Hydrodynamic Scaling of the Deceleration-Phase Rayleigh-Taylor Instability, 55th Annual Meeting of the American Physical Society Division of Plasma Physics, Nov. 11-13, 2013, 14 pages.
Bourne et al., Computational Design of Recovery Experiments for Ductile Metals, Proc. R. Soc. A, vol. 461, 2005, pp. 3297-3312.

Bradley et al., ASC Simulations of 2014 and 2015 2-Shock Campaign Shots, NEDPC 2015 Proceedings, Nuclear Explosives Design Physics Conference, 2015, 8 pages.
Brueckner et al., Laser-Driven Fusion, Reviews of Modern Physics, vol. 46, No. 2, Apr. 1974, pp. 325-367.
Bugrov et al., Interaction of a High-Power Laser Beam with Low-Density Porous Media, Journal of Experimental and Theoretical Physics, vol. 84, No. 3, Mar. 1997, pp. 497-505.
Buttler et al., The Study of High-Speed Surface Dynamics using a Pulsed Proton Beam, AIP Conference Proceedings on the Shock Compression of Condensed Matter, 2013, 5 pages.
Buttler et al., Transport of Particulate Matter from a Shocked Interface, AIP Conference on Shock Compression of Condensed Matter, Jun.-Jul. 2011, 10 pages.
Buttler et al., Unstable Richtmyer-meshkov Growth of Solid and Liquid Metals in Vacuum, J. Fluid Mech., vol. 703, 2012, pp. 60-84.
Callahan et al., A Distributed Radiator, Heavy Ion Target Driven by Gaussian Beams in a Multibeam Illumination Geometry, Nuclear Fusion, vol. 39, No. 7, 1999, pp. 883-891.
Callahan et al., Advances in Target Design for Heavy-Ion Fusion, 32nd European Physical Society Plasma Physics Conference Barcelona, Spain, 2005, 18 pages.
Caruso et al., Physical Processes in a Laser-greenhouse Target: Experimental Results, Theoretical Models, and Numerical Calculations, Journal of Russian Laser Research, vol. 21, No. 4, 2000, pp. 335-369.
Casey et al., Reduced Instability Growth With High-adiabat Highfoot Implosions at the National Ignition Facility, Phys Rev E Stat Nonlin Soft Matter Phys., vol. 90, No. 1, 2014, 5 pages.
Cauble et al., Demonstration of 0.75 Gbar Planar Shocks in X-ray Driven Colliding Foils, Phys Rev Lett., vol. 70, No. 14, 1993, 5 pages.
Cerjan, Integrated Diagnostic Analysis of ICF Capsule Performance, Lawrence Livermore National Laboratory, DPP-APS Annual Meeting, Oct. 29, 2012, 24 pages.
Cerjan et al., Integrated Diagnostic Analysis of Inertial Confinement Fusion Capsule Performance, Physics of Plasmas, vol. 20, 2013, pp. 056319-1-056319-9.
Chu, The Electron Cyclotron Maser, Reviews of Modern Physics, vol. 76, 2004, 52 pages.
Clark et al., Detailed Implosion Modeling of Deuterium-tritium Layered Experiments on the National Ignition Facility, Physics of Plasmas, vol. 20, 2013, pp. 056318-1-056318-14.
Clark, Detailed Implosion Modeling of DT-Layered Experiments on the National Ignition Facility, 54th APS-DPP Meeting, Oct. 29, 2012, 31 pages.
Clark et al., Progress in Modeling Ignition Implosion Experiments on the National Ignition Facility, 8th International Conference on Inertial Fusion Sciences and Applications Nara, Japan, Oct. 2013, 6 pages.
Clark et al., Radiation Hydrodynamics Modeling of the Highest Compression Inertial Confinement Fusion Ignition Experiment From the National Ignition Campaign, Physics of Plasmas, vol. 22, 2015, pp. 022703-1-022703-18.
Dimonte, Nonlinear Hydrodynamics, Instabilities and Turbulent Mix, Workshop on Scientific Opportunities in High Energy Density Plasma Physics, Aug. 25-27, 2008, 32 pages.
Dittrich et al., Design of a High-Foot High-Adiabat ICF Capsule for the National Ignition Facility, Phys Rev Lett., vol. 112, No. 5, 2014, pp. 055002-1-055002-5.
Doeppner, Mix in Cryogenic Dt Layered Implosions on the NIF, Presentation to the 54th Annual Meeting of the APS Division of Plasma Physics Providence, 2012, 32 pages.
Eggert, Shock and Ramp Compression Experiments: Recent Developments, European XFEL HED instrument user workshop Hamburg, Germany, 2014, 45 pages.
Eliezer et al., The Physics of Directly Driven Targets, Nuclear Fusion by Inertial Confinement: A Comprehensive Treatise, 1993, pp. 43-71.
Engelstad et al., Near Term Icf Target Test Chambers, 1996, 52 pages.

(56) References Cited

OTHER PUBLICATIONS

Fittinghoff et al., The Neutron Imaging System Fielded at the National Ignition Facility, EPJ Web of Conferences, vol. 59, 2013, pp. 13016-p. 1-13016-p. 5.

Fong et al., Stability of Converging Shock Waves, Physics of Fluids, vol. 22, No. 3, 1979, pp. 416-421.

Fujita et al., Implosion Property of Cannonball Target at 10.6 µm Laser Wavelength, Japanese Journal of Applied Physics, vol. 25, No. 2, Feb. 1986, pp. L145-LI47.

Fung et al., Ejecta Modeling in the Flag Hydrocode, 11th US National Congress on Computational Mechanics Minneapolis, Minnesota, 2011, 13 pages.

Gamaly, Hydrodynamic Instability of Target Implosion in Icf Nuclear Fusion by Inertial Confinement: A Comprehensive Treatise, 1993, pp. 321-349.

Glenzer et al., Cryogenic Thermonuclear Fuel Implosions on the National Ignition Facility, Phys. of Plasmas, vol. 19, 2012, pp. 056318-1-056318-15.

Glenzer et al., First Implosion Experiments With Cryogenic Thermonuclear Fuel on the National Ignition Facility, Plasma Phys. Control. Fusion, vol. 54, 2012, pp. 1-13.

Goldstein, Science of Fusion Ignition on NIF, U.S. Department of Energy by Lawrence Livermore National Laboratory, May 22-24, 2012, 111 pages.

Grim et al., Nuclear Imaging of the Fuel Assembly in Ignition Experiments, Physics of Plasmas, vol. 20, 2012, 30 pages.

Grim et al., Nuclear Imaging of the Fuel Assembly in Ignition Experiments a), Phys. Plasmas, vol. 20, 2013, pp. 056320-1-056320-12.

Haan et al., Design and modeling of ignition targets for the National Ignition Facility, Physics of Plasmas, vol. 2, No. 6, Jun. 1995, pp. 2480-2487.

Haan et al., Instability Growth Seeded by Oxygen in CH Shells on the National Ignition Facility, Physics of Plasmas, 2014, 30 pages.

Haan et al., Point design targets, specifications, and requirements for the 2010 ignition campaign on the National Ignition Facility, Physics of Plasmas, vol. 18, 2011, pp. 051001-1-051001-47.

Hammerberg et al., A Class of Ejecta Transport Test Problems, Necdc 2010 Conference, Los Alamos, 2011, 11 pages.

Hammerberg et al., Transport of Particle Matter From a Shocked Interface, American Physical Society March Meeting, 2011, 17 pages.

Hibbard et al., Precision Manufacturing of Inertial Confinement Fusion Double Shell Laser Targets for Omega, Fusion Science and Technology, vol. 45, Mar. 2004, pp. 117-123.

Hicks et al., Implosion dynamics measurements at the National Ignition Facility, Phys. Plasmas, vol. 19, 2012, 27 pages.

Hohenberger, Polar-direct-drive experiments on the National Ignition Facility, Physics of Plasmas, vol. 22, 2015, 16 pages.

Hurricane et al., The high-foot implosion campaign on the National Ignition Facility, Physics of Plasmas, vol. 21, 2014, 15 pages.

Izawa et al., Target Fabrication, Nuclear Fusion by Inertial Confinement: A Comprehensive Treatise, 1993, pp. 515-553.

Johnson et al., Neutron spectrometry—An essential tool for diagnosing implosions at the National Ignition Facility (invited), Review of Scientific Instruments, vol. 83, 2012, 7 pages.

Kane et al., Interface Imprinting by a Rippled Shock using an Intense Laser, Physical Review E, vol. 63, 2001, 4 pages.

Karasik, Inertial Fusion Energy with Direct Drive and KrF Lasers, Plasma Physics Division, U.S. Naval Research Laboratory, 2013, 46 pages.

Karow et al., Particle-Beam-Driven Icf Experiments, Nuclear Fusion by Inertial Confinement: A Comprehensive Treatise, Chapter 23, 1993, pp. 597-614.

Keane, National Ignition Facility High-Energy-Density and Inertial Confinement Fusion Peer-Review Panel (PRP) Final Report, NIF HED/ICF Peer-Review Panel Final Report, Lawrence Livermore National Laboratory, 2014, 32 pages.

Kessler et al., Icf Reactors—Conceptual Design Studies, Nuclear Fusion by Inertial Confinement; A Comprehensive Treatise, Chapter 25, 1993, pp. 673-723.

Kindel et al., Double-Shell Target Designs for the Los Alamos Scientific Laboratory Eight-beam Laser System, 1978, 14 pages.

Kirkwood et al., A Review of Laser-plasma Interaction Physics of Indirect-Drive Fusion, Plasma Phys. Control. Fusion, vol. 55, No. 10, Sep. 12, 2013, 27 pages.

Kirkwood et al., Producing High Energy ns Pump Beams for Raman Amplification of Short Pulses using SBS Beam Combination, Presentation at IZEST, 2013, 22 pages.

Kitagawa et al., Soft-X-Ray Emission from 1 µm Laser-Irradiated Cannonball Target, Japanese Journal of Applied Physics, vol. 25, Part 2, No. 3, Feb. 22, 1986, pp. L171-L174.

Kline et al., Demonstration of an Optical Mixing Technique to Drive Kinetic Electrostatic Electron Nonlinear Waves in Laser Produced Plasmas, 2012, 13 pages.

Kline, Hohlraum Drive and Implosion Velocity Scaling to 500 Tw Laser Drive on Nif, 54th Annual Meeting of the APS Division of Plasma Physics, 2012, 40 pages.

Knauer et al., Neutron Spectra Measured with Time-of-Flight Detectors on the National Ignition Facility, Division of Plasma Physics, 2011, 17 pages.

Krauser et al., Ignition Target Design and Robustness Studies for the National Ignition Facility, Physics of Plasmas, vol. 3, No. 5, Jan. 25, 1996, pp. 2084-2093.

Kritcher et al., Metrics for Long Wavelength Asymmetries in Inertial Confinement Fusion Implosions on the National Ignition Facility, Physics of Plasmas, vol. 21, Issue 4, 2014, pp. 042708-1-042708-10.

Laffite et al., Time History Prediction of Direct-drive Implosions on the Omega Facility, Physics of Plasmas, vol. 23, Issue 1, Dec. 2016, pp. 012706-1-012706-6.

Lafon, Hydrodynamic Stability of Direct-Drive Targets with High-Z Ablators, 2012, 12 pages.

Lindl, Development of the Indirect-Drive Approach to Inertial Confinement Fusion and the Target Physics Basis for Ignition and Gain, Physics of Plasmas, vol. 2, Issue 11, Jun. 1995, pp. 3933-4024.

Lindl et al., The Physics Basis for Ignition Using Indirect-Drive Targets on the National Ignition Facility, Physics of Plasmas, vol. 11, Issue 2, Feb. 2004, pp. 339-491.

Linford et al., Design Descriptions of the Prometheus-L and -H Inertial Fusion Energy Drivers, Fusion Engineering and Design, vol. 25, 1994, pp. 111-124.

Loomis, Summaries of FY13 LANL Experimental Campaigns at the OMEGA Laser Facility, Los Alamos National Laboratory, Laboratory for Laser Energetics Annual Report, Oct. 3, 2013, 17 pages.

Ma et al., Onset of Hydrodynamic Mix in High-Velocity, Highly Compressed Inertial Confinement Fusion Implosions, Physical Review Letters, vol. 111, No. 8, American Physical Society, Aug. 23, 2013, pp. 085004-1-085004-5.

Ma et al., Thin Shell, High Velocity Inertial Confinement Fusion Implosions on the National Ignition Facility, Physical Review Letters, vol. 114, No. 14, American Physical Society, Apr. 10, 2015, pp. 145004-1-145004-6.

Maclaren et al., Novel Characterization of Capsule X-Ray Drive at the National Ignition Facility, Physical Review Letters, vol. 112, No. 10, Mar. 14, 2014, pp. 105003-1-105003-5.

Martinez-Val et al., An Introduction to Nuclear Fusion by Inertial Confinement, Nuclear Fusion by Inertial Confinement: A Comprehensive Treatise, Chapter 1, 1993, 40 pages.

McClellan, Double-Shelled Target Simulations with Lasnex, Lawrence Livermore Laboratory, Oct. 24, 1978, 19 pages.

McCrory, Laser-Driven Icf Experiments, Nuclear Fusion by Inertial Confinement: A Comprehensive Treatise, Chapter 22, 1993, pp. 555-596.

Meezan, Inflight Properties of NIF Ignition Capsules Inferred from Convergent Ablator Experiments, 2012, 35 pages.

Merrill et al., The Neutron Imaging Diagnostic at NIF (Invited)a), Review of Scientific Instruments, vol. 83, No. 10, 2012, pp. 10D317-1-10D317-6.

(56) References Cited

OTHER PUBLICATIONS

Metzler et al., Target Study for Heavy Ion Beam Fusion†, Laser and Particle Beams, vol. 2, Part 1, 1984, pp. 27-48.
Molvig et al., Low Convergence Path to Fusion Ignition, Los Alamos National Laboratory, 2016, 28 pages.
Montgomery et al., LANL Double Shell Design and Preliminary Results, PSS/DS Workshop 2025, Los Alamos, Jan. 25-26, 2016, 30 pages.
Moses et al., High Energy Density Simulations for Inertial Fusion Energy Reactor Design, 16th ANS Topical Meeting on Fusion Energy, Sep. 14-16, 2004, 8 pages.
Murakami et al., Indirectly Driven Targets for Inertial Confinement Fusion, Nuclear Fusion, vol. 31, No. 7, 1991, pp. 1315-1331.
Nakai et al., Nuclear Aspects and Design of an Inertial Confinement Fusion Reactor, Fusion Engineering and Design, vol. 16, 1991, pp. 173-182.
National Research Council , An Assessment of the Prospects for Inertial Fusion Energy, Retrieved from internet at: http://www.nap.edu/catalog.php?record_id=18289, 2013, 247 pages.
National Research Council , Assessment of Inertial Confinement Fusion Targets, 2013, 119 pages.
Nietiadi et al., Sputtering of Si Nanospheres, Physical Review, vol. 90, No. 4, 2014, pp. 045417-1-0454179.
Nikroo, Target Fabrication for NIF and Inertial Fusion Energy (IFE), 2013, 23 pages.
Nishimura et al., Radiation-Driven Cannonball Targets for High-Convergence Implosions, Laser and Particle Beams, vol. 11, No. 1, 1993, pp. 89-96.
Nuckolls, Fusion Scientists are Encouraged by Recent Experiments Demonstrating the Efficient Coupling of Laser Light to Targets and New Ideas for Economically Competitive Power Plants, The Feasibili of Inertial-Confinement Fusion, 1982, pp. 24-31.
Nuckolls, Future of Inertial Fusion Energy, Nature, vol. 412, Sep. 4, 2002, pp. 775-776.
Nuckolls, Inertial Confinement Fusion Targets, Lawrence Livermore Lab., Oct. 4, 1977, 6 pages.
Nuckolls, Laser-induced Implosion and Thermonuclear Burn, Laser Interaction and Related Plasma Phenomena, 1974, pp. 399-425.
Nuckolls, Prospects for Laser Fusion, Lawrence Livermore Laboratory, May 13, 1974, 5 pages.
Nuckolls, Target Design, 1979, 330 pages.
Pape et al., Observation of a Reflected Shock in an Indirectly Driven Spherical Implosion at the National Ignition Facility, Physical Review Letters, Jun. 6, 2014, 5 pages.
Park et al., High-Adiabat High-Foot Inertial Confinement Fusion Implosion Experiments on the National Ignition Facility, Physical Review Letters, Feb. 7, 2014, 5 pages.
International Application No. PCT/US2017/014524, International Search Report and Written Opinion dated Oct. 4, 2017, 8 pages.
Peterson et al., Pressure Loadings on the Walls of a Light Ion Laboratory Microfusion Facility Target Chamber, Fusion Technology Institute University of Wisconsin—Madison WI 53706, vol. 608 (http://fti.neep.wisc.edu), Oct. 11, 1990, 9 pages.
Pollaine et al., National Ignition Facility Scale Hohlraum Asymmetry Studies by Thin Shell Radiography, Physics of Plasmas, vol. 8, Issue No. 5 http://dx.doi.org/10.1063/1.1364514, 2001, pp. 2357-2365.
Radha et al., Simulations and results from the National Ignition Facility, Physics of Plasmas, vol. 23 http://dx.doi.org/10.1063/1.4946023, 2016, 13 pages.
Raman et al., An In-Flight Radiography Platform to Measure Hydrodynamic Instability Growth in Inertial Confinement Fusion Capsules at the National Ignition Facility, Physics of Plasmas, vol. 21, http://dx.doi.org/10.1063/1.4890570, 2014, 21 pages.
Regan et al., Hot-Spot Mix in Ignition-Scale Inertial Confinement Fusion Targets, Physical Review Letters, Jul. 26, 2013, 5 pages.
Reinovsky et al., High Energy Density Physics Experiments with Compact Pulsed Power Drivers and Advanced Diagnostics (U), 2011, 22 pages.
Reintjes et al., Stimulated Raman and Brillouin Scattering, 2010, 59 pages.
Reis et al., The Big Science of Stockpile Stewardship, Physics Today, vol. 68, No. 8, Retrieved from Internet: http://dx.doi.org/10.1063/PT.3.3268, 2016, 9 pages.
Remington et al., Hydrodynamic Instabilities and Mix Studies on NIF: predictions, observations, and a path forward, Oct. 24, 2013, 7 pages.
Roberts et al., The Stability of Multiple-Shell ICF Targets, The Institute of Physics, vol. 13, 1980, pp. 1957-1969.
Robey et al., High Performance Capsule Implosions on the OMEGA Laser Facility with Rugby Hohlraums, Physics of Plasmas, vol. 17, 2010, pp. 1-11.
Robey et al., Hohlraum-Driven Mid-Z (SiO2) Double-Shell Implosions on the Omega Laser Facility and Their Scaling to NIF, Physical Review Letters, Oct. 2, 2009, pp. 1-4.
Robey et al., Precision Shock Tuning on the National Ignition Facility, Physics Review Letters, vol. 108, No. 21, 2012, 5 pages.
Rosen et al., The Indirect Drive Ignition Campaign on the National Ignition Facility (NIF), Jul. 18, 2013, 52 pages.
Rosocha et al., Excimer Lasers for Icf, Nuclear Fusion by Inertial Confinement: A Comprehensive Treatise, Chapter 15, 1993, pp. 371-420.
Roth et al., Fast Ignition by Intense Laser-Accelerated Proton Beams, Physical Review Letters, vol. 86, No. 3, Jan. 15, 2001, 4 pages.
Rygg et al., 2D X-Ray Radiography of Imploding Capsules at the National Ignition Facility, Physical Review Letters, May 16, 2014, 7 pages.
Rykovanov et al., Interaction of Intense Laser Pulses with Overdense Plasmas, Theoretical and Numerical Study, Nov. 2, 2009, 124 pages.
Schnittaman et al., Indirect-Drive Radiation Uniformity in Tetrahedral Hohlraums, Physics of Plasmas, vol. 3, No. 10http://dx.doi.org/10.1063/1.871511, 1996, 13 pages.
Scott et al., Numerical Modeling of the Sensitivity of X-Ray Driven Implosions to Low-Mode Flux Asymmetries, 2012, 5 pages.
Sethian et al., Target Physics Issues, Naval Research Laboratory, Jun. 20, 2000, 16 pages.
Shvydky, Two-Dimensional Numerical Evaluation of 1-D Multi-FM SSD Experiments on OMEGA EP, 2013, 12 pages.
Smalyuk et al., First Measurements of Hydrodynamic Instability Growth in Indirectly Driven Implosions at Ignition-Relevant Conditions on the National Ignition Facility, Physical Review Letters, May 9, 2014, 7 pages.
Smith, Reflectivity Variation of Target Surfaces, Innoven Proprietary YELLOW Document, May 27, 2016, 15 pages.
Soures, Solid-state Lasers for Icf, Nuclear Fusion by Inertial Confinement: A Comprehensive Treatise, Chapter 14, 1993, pp. 351-370.
Stepanov et al., Energy Efficiency of Laser Greenhouse Target for Small Number of Irradiating Beams, Proceedings of SPIE, vol. 5228, 2003, pp. 233-243.
Takabe et al., Effect of Nonuniform Implosion on High-Gain Intertial Confinement Fusion Targets, Japanese Journal of Applied Physics, vol. 32, Part 1, No. 12A, 1993, pp. 5675-5680.
Temporal et al., Irradiation uniformity of directly driven inertial confinement fusion targets in the context of the shock-ignition scheme, Plasma Phys. Control. Fusion, vol. 53, 10 pages, 2011.
Temporal et al., Three-Dimensional Study of Radiation Symmetrization in Some Indirectly Driven Heavy Ion ICF Targets, Nuclear Fusion, vol. 32, No. 4, 1992, pp. 557-567.
Teubner et al., Absorption and Hot Electron Production by High Intensity Femtosecond Uv-Laser Pulses in Solid Targets, Physical Review E, vol. 54, No. 4, Oct. 1996, 11 pages.
Timmes X-2 et al., Spatial-Temporal Convergence Properties of the Tri-lab Verification Test Suite in 1d for Code Project A, 2006, 55 pages.
Tommasini et al., Tent-induced perturbations on areal density of implosions at the National Ignition, Physics of Plasmas, vol. 22, Issue. 5, 2015, 8 pages.
Town et al., Dynamic Symmetry of Indirectly Driven Inertial Confinement Fusion Capsules on the National Ignition Facilitya), Physics of Plasmas, vol. 21, 2014, 10 pages.

(56) References Cited

OTHER PUBLICATIONS

Uesaka et al., Parametric Survey of Microfireball Calcuilation for the Light Fusion Target Development Facility Design, Fusion Technology Institute, Aug. 1983, 62 pages.

Vandevender, Light-ion Accelerators for Icf Nuclear Fusion by Inertial Confinement: A Comprehensive Treatise, Chapter 18, 1993, pp. 455-483.

Varnum et al., Progress toward Ignition with Noncryogenic Double-Shell Capsules, Physical Review Letters, vol. 84, No. 22, May 29, 2000, 3 pages.

Velarde et al., Nuclear Fusion by Inertial Confinement A Comprehensive Treatise, 1993, 759 pages.

Weilacher et al., The Effect of Laser Spot Shapes on Polar-Direct-Drive Implosions on the National Ignition Facility, Physics of Plasmas, vol. 22, 2015, 32 pages.

Welser et al., Development of Two Mix Model Postprocessors for the Investigation of Shell Mix in Indirect Drive Implosion Cores, Physics of Plasmas, vol. 14, 2007, 6 pages.

Winterberg, Mini Fission-Fusion-Fission Explosions (Mini-Nukes). A Third Way Towards the Controlled Release of Nuclear Energy by Fission and Fusion, z. Naturforsch, vol. 59a, 2004, pp. 325-336.

Yabe, The Compression Phase in Icf Targets, Nuclear Fusion by Inertial Confinement: A Comprehensive Treatise, Chapter 11, 1993, pp. 269-292.

Yabe et al., Theoretical and Computational Investigation on Implosion Process, Laser Interaction and Related Plasma Phenomena, 1984, pp. 857-868.

Yamanaka, Diagnostics of Laser-imploded Plasma, Nuclear Fusion by Inertial Confinement: A Comprehensive Treatise, Chapter 20, 1993, pp. 497-513.

Zinamon, Ion Beams-Target Interaction, Nuclear Fusion by Inertial Confinement: A Comprehensive Treatise, Chapter 5, 1993, pp. 119-150.

Zylstra et al., In-Flight Observations of Low-Mode $\rho R$ Asymmetries in NIF Implosionsa), Physics of Plasmas, vol. 22, 2015, pp. 056301-1-056301-9.

\* cited by examiner

STRUCTURE FOR CONTAINMENT OF RADIATION FROM AN ICF

CROSS-REFERENCES TO RELATED APPLICATIONS

This application claims the benefit of U.S. Provisional Application No. 62/388,296 filed on Jan. 22, 2016, which is incorporated herein by reference.

BACKGROUND

Nuclear fusion by inertial confinement, Inertial Confinement Fusion ("ICF"), utilizes nuclear fusion reactions to produce energy. In most types of ICF systems, an external drive mechanism, such as a laser, delivers energy to a target containing nuclear fusion fuel. The target is designed to use this energy to compress, heat and ignite the fusion fuel within the target. If a sufficient amount of fuel is compressed sufficiently and heated sufficiently, a self-sustaining fusion reaction can occur in which energy produced by fusion reactions continues to heat the fuel. This is generally referred to as "ignition." The inertia of the compressed fuel can keep it from expanding long enough for significant energy to be produced before expansion of the fuel and the resultant cooling terminates the fusion reaction.

ICF targets release energy in the form of high-velocity subatomic particles (ions and neutrons), x-ray radiation, and kinetic energy of the expanding debris field. The target is ignited inside a vacuum chamber, which is responsible for safely containing the energy output of the target, and potentially converting it into useful form (for example, steam). In general, the required size of the containment chamber increases with the energy output of the target. High-performance targets, involving high gains and/or large output energies, may require very large containment chambers.

BRIEF SUMMARY

The spectrum of energy output from an ICF target may be comprised of charged particles, neutrons, x-ray radiation, and an expanding field of target debris. For many target and containment chamber systems, the x-ray radiation component may be the most challenging to contain. Conventional containment chamber designs absorb the radiation energy directly on the surface of the chamber wall. For targets that emit a large amount of energy as radiation, a very large chamber or very complicated wall design may be required in order to avoid unacceptable wall damage from the radiation.

Embodiments described herein can contain the radiation output of an ICF target by absorbing the radiation energy over a long distance in a low-pressure gas filling a heat exchanger structure, as opposed to directly on a wall surface, with the gas then conducting and re-radiating that energy into the heat exchanger surface over a much longer timescale. This can reduce the size and cost of ICF target containment chambers.

In some embodiments, a confinement chamber for Inertial Confinement Fusion (ICF) may include a chamber wall comprising a plurality of holes positioned to receive x-ray radiation from an ICF target, and a plurality of pipes that are coupled to the plurality of holes and radiating outward from the chamber wall. The plurality of pipes may radiate outward from the chamber wall in a direction that is parallel with a direction of the x-ray radiation from the ICF target. The plurality of pipes may radiate outward from the chamber wall in a direction that is normal to the chamber wall. The chamber may further include a plurality of gas injection nozzles coupled to the plurality of pipes. The plurality of gas injection nozzles may be configured to deposit a gas into the plurality of pipes prior to the activation of an external drive mechanism. The gas may include nitrogen. The chamber may further include a directional output sleeve configured to direct the x-ray radiation from the ICF target towards the plurality of holes. The chamber wall may be cylindrical with two rounded ends, wherein the plurality of holes may be located on the two rounded ends. The plurality of holes and the plurality of pipes may have a hexagonal cross-section. The plurality of pipes may have a cross-section with a varying radius along the length of each of the plurality of pipes.

In some embodiments, a method of using an ICF chamber may include causing a target in the ICF chamber to emit x-ray radiation; receiving the x-ray radiation through a plurality of holes in a wall of the ICF chamber; and absorbing the x-ray radiation in a gas contained in a plurality of tubes that are coupled to the plurality of holes. The method may also include directing the x-ray radiation towards the plurality of holes using a directional-radiation-output sleeve. The method may additionally include injecting the gas into the plurality of tubes prior to causing the target in the ICF chamber to emit the x-ray radiation. The gas contained in the plurality of tubes may have a density of at least approximately $7 \times 10^{-6}$ g/cc before causing the target in the ICF chamber to emit x-ray radiation. The method may further include conducting energy into walls of the plurality of pipes from the gas via thermal conduction and re-radiation. The method may also include conducting heat out of the walls of the plurality of pipes by a coolant flowing between the plurality of pipes. The plurality of pipes may radiate outward from the chamber wall in a direction that is parallel to a direction of the x-ray radiation from the ICF target. The chamber wall may be spherical and the plurality of holes may be evenly distributed around the chamber wall. The method may additionally include receiving neutron emissions from the ICF target by one or more neutron-absorbing blocks. The one or more neutron-absorbing blocks may be located on a first section of the chamber wall, and the plurality of holes may be located on a second section of the chamber wall.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
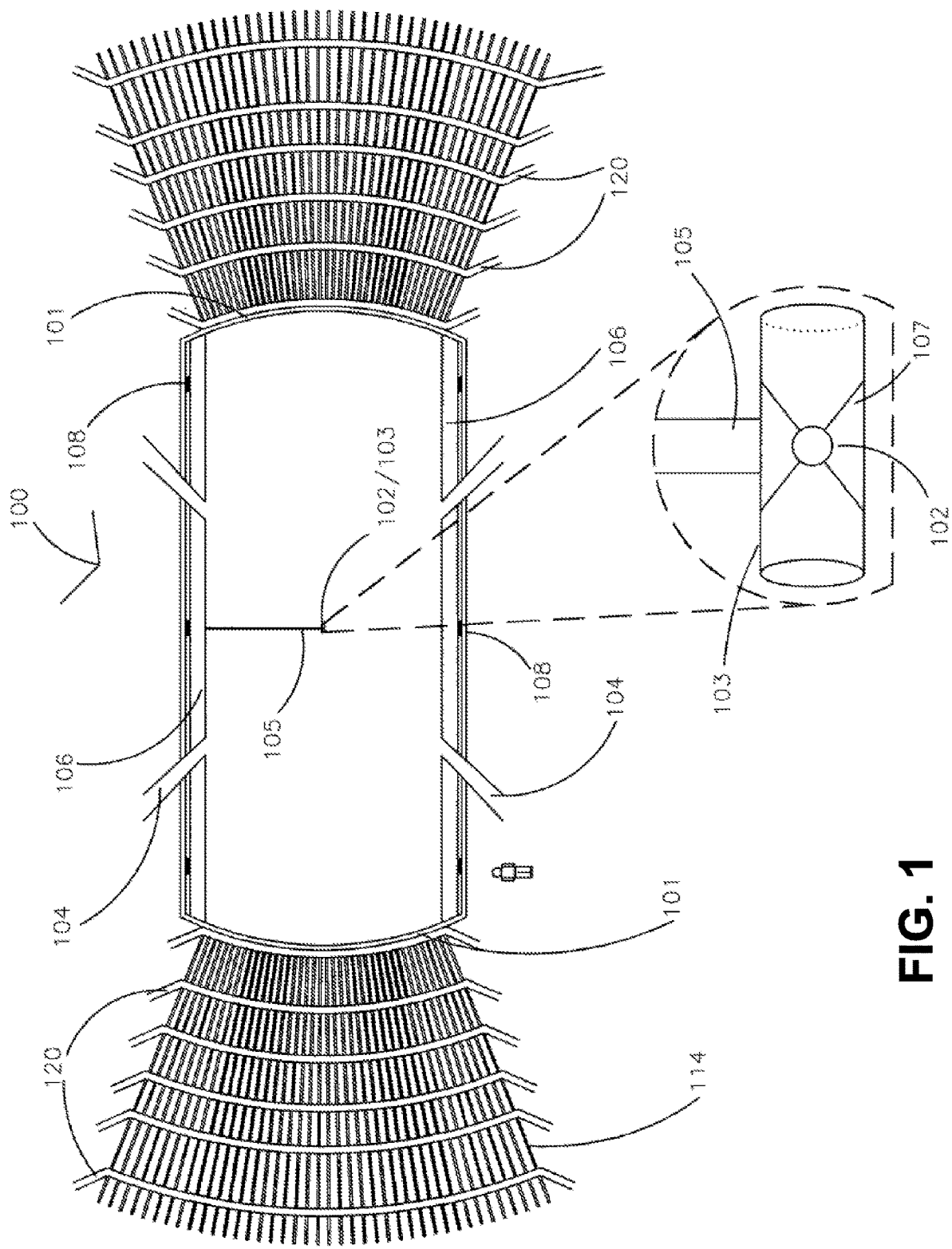
FIG. 1 illustrates a cross-section embodiment of this invention, comprised of a cylindrical containment chamber with radiation containment pipes at each end, according to some embodiments.

The term "Z" may refer to the atomic number of an element, i.e. the number of protons in the nucleus. The term "A" may refer to the atomic mass number of an element, i.e. the number of protons and neutrons in the nucleus.

The term "approximately" includes a given value plus/minus 15%. For example, the phrase "approximately 10 units" is intended to encompass a range of 8.5 units to 11.5 units.

The term "isentropic drive mechanism" may refer to a drive mechanism that is designed or utilized to compress material (such as fusion fuel) in an isentropic manner. "Isentropic" means compressing material while minimizing the total entropy increase (heating) of the material. Isentropic compression is therefore the most efficient way to compress material. When imploding a sphere or shell of material, such as an ICF target, isentropic compression requires that the drive mechanism deliver pressure to the material in a specific way over the entire duration of the compression, utilizing a low pressure initially that is increased over the course of the compression according to a mathematical formula. This can be difficult to achieve, and complicates the design of both the target drive mechanism and the driver that delivers energy to the drive mechanism (such as a laser or heavy ion beam).

The term "quasi-isentropic drive mechanism" may refer to a drive mechanism that approximates an ideal, perfectly-isentropic compression using a means other than a ramped pressure profile. For instance, drive mechanisms that compress material by producing a series of shocks of increasing strength may approach the efficiency of a perfectly-isentropic compression. While in some circumstances that are simpler than perfectly isentropic versions, these drive mechanisms are still complex to engineer.

The term "impulsive drive mechanism" may refer to a drive mechanism that compresses material impulsively, typically by the production of a single shock wave that accelerates the material and causes it to move inward. The pressure produced by an impulsive drive mechanism is typically highest at the beginning of the implosion, and decreases afterward. Impulsive drive mechanisms are limited in the amount of compression they can produce and in the efficiency of compression achieved. They may be simpler to design and use than other drive mechanisms. For instance, an impulsive drive mechanism may not require that the driver (laser, heavy ion beam, etc.) be active during the entire course of the implosion, but may instead deliver its energy over a shorter timescale, potentially short comparable to the timescale of hydrodynamic motion in the target.

The term "shock" may refer to sharp discontinuities in the flow of material. These discontinuities can be induced in any hydrodynamic variables such as temperature, pressure, density, velocity, etc.

The term "shock convergence" may refer to the convergence of a shock which may travel from an outer shell and to an inner shell. It is calculated as the ratio of the outer radius of an inner shell, $R_c$, and the inner radius of an outer shell $R_O$. That is, $$SC = \frac{R_o}{R_c}.$$

For instance, given a first shell with an inner radius of 10 cm, and a second shell disposed within the first shell with a inner radius of 0.5 cm, the shock convergence is 20. Any other combination of inner and outer radiuses can be used.

The term "atom" may refer to a particle of matter, composed of a nucleus of tightly-bound protons and neutrons with an electron shell. Each element has a specific number of protons.

The term "neutron" may refer to a subatomic particle with no electrical charge. Their lack of a charge means that free neutrons generally have a greater free range in matter than other particles. The term "proton" may refer to a subatomic particle with a positive electrical charge. The term "electron" may refer to a subatomic particle with a negative electrical charge, exactly opposite to that of a proton and having less mass than a proton and a neutron. Atoms under ordinary conditions have the same number of electrons as protons, so that their charges cancel.

The term "isotope" may refer to atoms of the same element that have the same number of protons, but a different number of neutrons. Isotopes of an element are generally identical chemically, but may have different probabilities of undergoing nuclear reactions. The term "ion" may refer to a charged particle, such as a proton or a free nucleus.

The term "plasma" may refer to the so-called fourth state of matter, beyond solid, liquid, and gas. Matter is typically in a plasma state when the material has been heated enough to separate electrons from their atomic nuclei.

The term "Bremsstrahlung radiation" may refer to radiation produced by interactions between electrons and ions in a plasma. One of the many processes that can cool a plasma is energy loss due to Bremsstrahlung radiation.

The product "pr" may refer to the a real mass density of a material. This term may refer to a parameter that can be used to characterize fusion burn. This product is expressed in grams per centimeter squared, unless otherwise specified.

The term "runaway burn" may refer to a fusion reaction that heats itself and reaches a very high temperature. Because the D-T reaction rate increases with temperature, peaking at 67 keV, a D-T plasma heated to ignition temperature may rapidly self-heat and reach extremely high temperatures, approximately 100 keV, or higher.

The term "burn fraction" may refer to the percentage of fusion fuel consumed during a given reaction. The greater the burn fraction, the higher the energy output.

The term "convergence" may refer to how much a shell (or material) has been compressed radially during implosion. For instance, a shell that starts with a radius of 0.1 cm, R, and is compressed to a radius of 0.01 cm, $R_c$, during implosion has a convergence of 10. That is, $$C = \frac{R}{R_c}.$$

Nuclear fusion may refer to a type of reaction that occurs when certain atomic nuclei collide. In most of these reactions, two light nuclei combine, producing heavier nuclei and/or nuclear particles. In the process, some of the energy in the nuclear bonds holding the nuclei together is released, usually settling in the form of thermal energy (heat) in the material surrounding the reacting particles. These reactions only occur between atomic nuclei that are very energetic, such as those that have been heated to a high temperature to form a plasma. The specific temperatures vary between reactions. The reaction between deuterium and tritium, two hydrogen isotopes, is generally considered to require the lowest temperature for ignition. As other fusion reactions require higher temperatures, most nuclear fusion power concepts envision the use of D-T fuel.

Two challenges in using nuclear fusion to produce power are referred to as ignition and confinement. Achieving ignition requires heating a plasma of fusion fuel until it becomes hot enough to heat itself, meaning the energy released from fusion reactions exceeds the energy lost through various processes, such as Bremsstrahlung radiation and hydrodynamic expansion. The temperature at which this occurs is known as the "ignition temperature," which for D-T fuel can range from 2-10 keV, depending on the physical properties of the plasma. After ignition, self-heating in the fuel can cause it to reach temperatures of 100 keV or more.

Once fuel has been ignited, confinement may refer to the challenge of keeping the fuel from expanding (thus cooling and ceasing to burn) long enough for it to produce the desired amount of energy: at least as much energy as was required to ignite the fuel and keep it confined—and hopefully significantly more. While heating the fuel to ignition is simply a matter of delivering energy to it, confinement is more challenging. There is no known way to confine a plasma heated to ignition temperature or beyond with a simple mechanical system. Any solid substance, such as the metal wall of a container, that comes into contact with a fusion plasma would either become instantly vaporized, would drastically cool the plasma and stop the burn itself, or both.

One method of confinement uses a magnetic field to keep the fuel from expanding. This is referred to as Magnetic Confinement Fusion (MCF). Magnetic confinement has many inherent difficulties and disadvantages, and economical power generation from an MCF facility appears decades away.

Another approach takes advantage of how the characteristics of fusion burn change with fuel amount and density. At ordinary densities and practicable amounts, a D-T plasma heated to ignition temperature will disassemble (expand and stop burning) before producing anywhere near the energy required to originally heat it. However, as the density of a given amount of fuel is increased, the rate at which the fuel will burn increases faster than the rate at which it will expand. This means that, if the fuel can be compressed sufficiently before heating it, the fuel's own resistance to motion (inertia) will keep it from expanding long enough to yield a significant amount of energy. This approach is referred to as Inertial Confinement Fusion (ICF).

At the pressures and temperatures involved in imploding and burning ICF targets, specific material properties that one observes in everyday life (hardness, strength, room temperature thermal conductivity, etc.) may be irrelevant, and the hydrodynamic behavior of a material can depend most strongly on the material's average atomic number, atomic mass number, and solid density. As such, in discussing material requirements in ICF targets, it is convenient to discuss classes of material. For the purposes of the following discussion, the term "low-Z" will refer to materials with an atomic number of 1-5 (hydrogen to boron); the term "medium-Z" will refer to materials with an atomic number of 6-47 (carbon to silver); and the term "high-Z" will refer to materials with an atomic number greater than 48 (cadmium and above). Unless otherwise stated, the use of these terms to describe a class of material for a specific function is intended only to suggest that this class of material may be particularly advantageous for that function, and not (for instance) that a "high-Z" material could not be substituted where a "medium-Z" material is suggested, or vice-versa.

Specific material choice may be important, where indicated, as different isotopes of the same element may undergo completely different nuclear reactions, and different elements may have different radiation opacities for specific frequencies. The differing solid densities of materials with similar-Z may also important for certain design criteria in some embodiments.

The release of energy from an ICF target igniting and burning inside a vacuum containment chamber occurs in several discrete stages. For the purposes of the following discussion, a target that burns primarily D-T fuel may be considered, but the general principles may be applied to targets utilizing other fusion reactions.

When the fuel first ignites and begins to burn, the D-T reaction immediately emits 14 MeV neutrons. These neutrons may scatter off fuel and structural material in the target, and as a result of scattering, lose energy and heat the target. However, ICF targets are generally too small to stop or scatter a significant fraction of the D-T neutrons, and so these neutrons quickly escape the target and enter the walls of the containment vessel. The neutron flux lasts only approximately as long as the fuel is burning, a few nanoseconds at most for most target designs.

As this is happening, the fusion reactions in the fuel heat the target to very high temperatures, potentially hundreds of keV in the fuel itself and tens of keV or more in the target structural materials. At these temperatures, cooling of the target may occur in two ways: bremsstrahlung radiation, and adiabatic cooling as the target expands due to the extremely high temperatures and pressures within.

Bremsstrahlung radiation results in the transformation of the target's thermal energy into x-rays, which are emitted from the target and immediately travel to the containment chamber wall. Adiabatic cooling results in the transformation of the target's thermal energy into kinetic energy of the expanding target debris field. A target designer may choose certain parameters of the target (size, composition, structure, etc.) in order to achieve a desired distribution of the total yield between neutrons, debris, and radiation, and/or to tailor the spectrum of radiation emitted. For instance, one may generally increase the amount of radiation emitted by a target by decreasing the amount of non-fuel mass in the target. Also, in some targets one may generally shift the spectrum of radiation emitted towards an ideal black-body distribution by surrounding the target with a high-Z metal shield. Some techniques for doing this are disclosed in co-pending application Ser. No. 13/068,681, Robert O. Hunter Jr. et. al., filed May 17, 2011, entitled "ICF Targets With Directional Output and Altered Output Spectrums" which is incorporated herein by reference. For a typical D-T target, approximately 70% to 80% of the energy produced may be released as neutrons, with x-ray radiation and debris composing the remaining approximately 20% to 30%.

Each type of target output occurs on a different timescale and poses a different containment problem. The neutron output occurs first, lasts on the order of a few nanoseconds, and is relatively easy to contain because neutrons travel long distances in materials before stopping, having an interaction length of approximately 6.5 cm in graphite. Thus, even though the majority of a target's energy output may be carried by neutrons, the neutrons' energy can be distributed over a large amount of material (e.g. a graphite slab), minimizing the temperature increase experienced in any individual section of material. As a result, effective containment of an ICF target's neutron output may be considered relatively straightforward to achieve.

Concurrently with or slightly after the neutron flux, the x-ray radiation emitted by the target reaches the containment chamber walls. Unlike neutrons, x-rays emitted by a typical ICF target do not deeply penetrate material. The exact distance depends on the specific material and the average energy of the x-rays (often characterized by the approximate black-body temperature). As an example, 1 keV of x-rays have an absorption length of approximately 2.4 µm in graphite. For a fixed amount of energy being contained, this may make energy in x-rays much more difficult to contain than energy in neutrons. Rather than being absorbed throughout the depth of a containment chamber wall, x-rays are absorbed just in the surface. A high x-ray fluence can melt the surface of a containment chamber wall, or even vaporize it and/or ablate it off, potentially driving a damaging shockwave through the containment structure. For example, in some conditions involving x-rays normally incident on graphite with a spectrum characterized by a blackbody temperature T, the expression $\varphi = 100 * T^{(3/2)}$ may be used to estimate the fluence at which the graphite surface will vaporize, where the temperature T is given in keV, and the fluence $\varphi$ is given in $J/cm^2$. This expression may be valid for temperatures T between approximately 0.1 keV and 20 keV.

In conventional designs, this problem has two solutions: the containment chamber wall can be constructed of exotic materials and configurations that can withstand very high temperatures (or materials that have very low opacities, so as to maximize the radiation penetration length); or, the size of the containment chamber can be increased so that the wall surface area is large enough so that the radiation fluence is below the damage threshold for the wall material. As the opacity and temperature tolerance of the chamber wall are limited by the properties of the materials available, the use of a suitably large containment chamber is often the only viable solution.

The third type of energy output, debris, can be challenging to contain as well. Typically, the outer regions of the expanding debris field will first impact the chamber wall at high speed, and then "stagnate" as the outward-moving debris stops against the wall. This debris impact drives a transient pressure pulse into the wall, which in some cases may be strong enough to produce a damaging shockwave in the containment structure. As the debris stagnates, its kinetic energy is transformed back into thermal energy. The heated material will simultaneously transfer energy to the wall by radiation and thermal conduction, as well as expand back into the center of the containment chamber. After a transient equilibration period, the debris may fill the containment chamber approximately uniformly, at approximately constant temperature, and exert a constant outward pressure on the containment chamber wall. This pressure will slowly decrease as the debris field cools, or is evacuated from the chamber by pumps or other means.

Debris containment therefore requires at least that: (1) that the containment chamber be designed to withstand the initial impulse of the debris striking the wall, (2) that the containment chamber be able to withstand the "delayed" heating that occurs as the temperature of the stagnating debris increases, and (3) that the containment chamber be able to withstand the static pressure of the hot debris filling the chamber once it has equilibrated.

Some embodiments described herein may be directed at enabling the absorption of a large amount of energy from an ICF target in the form of x-rays without requiring a physically large containment structure. For combinations of targets and containment system designs in which the radiation output of the target is the limiting factor, these embodiments may enable the use of much smaller containment vessels than previously possible. Additionally, some embodiments may enable the economic containment of targets with much higher energies than was previously possible, so long as those targets emit a sufficient fraction of their output in the form of x-ray radiation.

FIG. 1 illustrates an embodiment with target 102 positioned in the center of containment chamber 100 and aligned with beam entry ports 104. Beam entry ports 104 may be connected to an external drive mechanism, such as a laser or particle beam (not shown). Containment chamber 100 may comprise an approximately 30 m long by approximately 7 m radius cylinder, with metal walls approximately 10 cm thick. The circular ends 101 of the cylinder may be spherical sections, with a radius of curvature of approximately 15 m. Target 102 may be surrounded by an open-ended, cylindrical, metal, directional-radiation-output sleeve 103. Directional-radiation-output sleeve 103 may have the same proportions as the containment chamber 100, with an inner radius of a few times that of target 102's outer radius, and may be made of a material that is highly reflective to x-ray radiation (i.e., a dense, high-opacity material). The long axis of directional-output sleeve 103 may be parallel with and may be identical to the long axis of containment chamber 100.

Target 102 may be positioned inside directional output sleeve 103 by various means, such as struts 107 or other supports. Target 102 and directional output sleeve 103 can together be centered and supported in containment chamber 100 by various means, e.g. suspended from the top of chamber 100 by metal stalk 105, suspended by tensioned metal wires from above and below, etc.

Figure 2:
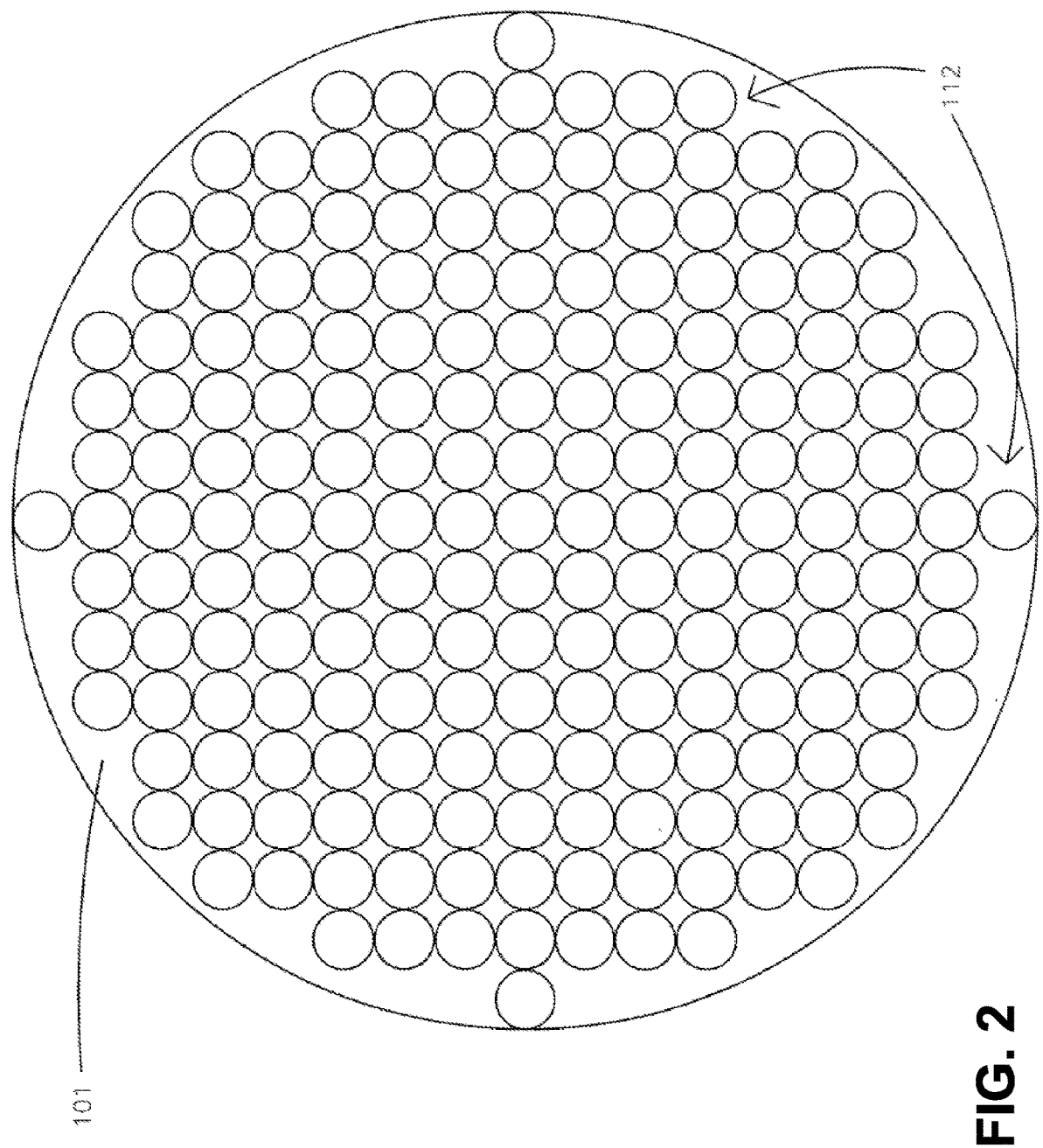
FIG. 2 illustrates a view of configuration of radiation containment pipes at each end of the cylindrical containment chamber, according to some embodiments.

Lining the walls of the sides of the cylinder may be blocks 106 of neutron-absorbing material (e.g. graphite), mounted to the cylinder. Graphite blocks 106 may be mounted directly to the cylinder wall, or mounted via shock-absorbing mounts 108, such as pistons, springs, etc. As shown in FIG. 2, the two circular ends 101 of the cylinder may contain a dense matrix of circular holes 112, each approximately 10 cm in diameter. In this embodiment, each end of the cylinder may contain 3,200 holes. Each hole may be manufactured normal to the surface of cylinder end 101. Holes 112 may be configured in a pattern that achieves efficient tiling of holes on the surface of cylinder end 101, so that the actual solid surface area of cylinder end 101 is no larger than necessary to support holes 112.

Each hole 112 may be connected to a corresponding cylindrical, metal radiation-heat-exchanging pipe 114. Thus, there may be approximately 6,400 pipes in total, with approximately 3,200 on each end. Each pipe 114 may have an interior radius equivalent to that of the corresponding hole 112, and a length of approximately 15 m. The long axis of each heat-exchanging pipe 114 may be normal to the surface of cylinder end 101.

Figure 3:
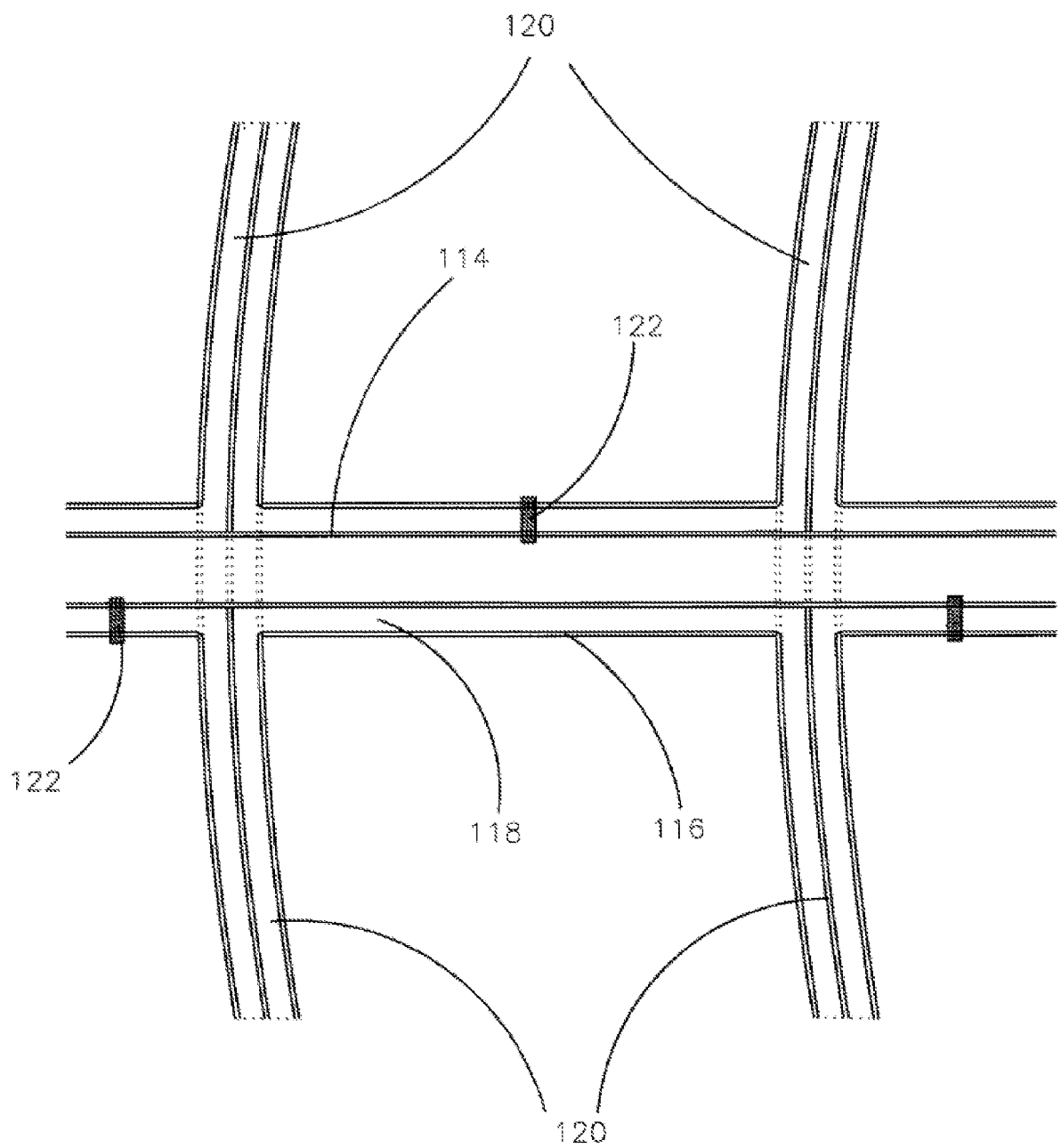
FIG. 3 illustrates an expanded view of the radiation containment pipes and their associated coolant manifolds and cooling apparatus, according to some embodiments.

As illustrated in detail in FIG. 3, and surrounding each heat-exchanging pipe 114, may be a cooling jacket, comprised of an outer metal sheath 116 and a coolant region 118. Coolant regions 118 may join multiple coolant manifolds 120 along the length of heat-exchanging pipes 114. Gas injection nozzles 122 may also be distributed throughout the length of each heat-exchanger pipe 114. These nozzles may penetrate outer metal sheath 116 and coolant region 118.

In operation of some embodiments, containment chamber 100 may be evacuated to a level of vacuum suitable for propagation of the external drive mechanism beams. This vacuum may be achieved by any suitable means, such as vacuum pumps connected to ports in the containment chamber walls (not shown). Before the external drive mechanism fires, injection nozzles 122 may inject a gas (in this embodiment, nitrogen) into the heat-exchanging pipes 114, so as to achieve a minimum density of gas throughout the length of pipes 114 of approximately $7 \times 10^{-6}$ g/cc before the drive mechanism fires.

After the gas injection, the external drive mechanism may fire immediately, before the gas injected into pipes 114 significantly propagates into the main volume of containment chamber 100, igniting target 102. Target 102 may burn, initially releasing neutrons which may be absorbed in the neutron-absorbing blocks 106 in the near chamber walls. Subsequently, the target may begin to expand and emit x-ray radiation. However, the directional radiation output sleeve 103 may be highly reflective to radiation, and may serve to direct the x-ray radiation produced by target 102 out the ends of sleeve 103 and towards cylinder ends 101 and the multitude of heat-exchanging pipes 114. Because directional output sleeve 103 may be built in the same proportions (length and width) as containment chamber 100, directional output sleeve 103 may shield the sides of containment chamber 100 from the prompt radiation output of target 102. Note that, as target 102 expands, cools, and ceases radiating, directional-radiation-output sleeve 103 may simply become part of the target debris field.

The x-ray radiation emitted by target 102 may be absorbed in the gas that was injected into heat-exchanging pipes 114 before the shot. This absorption may occur over a period of a few nanoseconds, and may occur primarily by ionization of the gas. The gas may be heated to a high temperature, resulting in a peak pressure of approximately 35 bar in the pipes. Subsequently, the hot gas may conduct energy into the walls of heat-exchanging pipes 114 via thermal conduction and re-radiation. This may occur over a much slower timescale than the radiation absorption, which may be approximately 0.2 milliseconds in some embodiments. Simultaneously, the gas may expand outward into the main volume of containment chamber 100, ultimately mixing and equilibrating with the target debris field. As this debris field impacts the neutron-absorbing blocks 106, shock-absorbing mounts 108 may protect the structural wall of chamber 100 from any shock produced by the debris impact.

Absorption of the prompt x-ray radiation in the gas may be advantageous because the gas cannot be damaged by high fluences as a mechanical wall might be. By absorbing the energy and then conducting and re-radiating it over a long period, the gas shields the heat-exchanging pipe walls from the high-intensity prompt radiation field. The use of a multitude of pipes allows for an increased surface area for absorption of heat from the gas, and makes containing the pressure of the heated gas feasible, because the pipes may be economically constructed with a low aspect ratio and high pressure capacity. As the gas conducts and radiates energy into heat-exchanging pipes 114, this energy may be carried away by coolant (such as water) flowing between pipes 114 and metal sheath 116 in coolant region 118. It is estimated that this configuration will enable the containment of approximately 65 GJ of 1 keV black-body radiation. In comparison, containing the same amount of energy in a conventional chamber configuration may require a sphere with a radius as large as 72 m.

The embodiment described above is merely an example, intended to illustrate the basic operating principles of embodiments of this invention in the context of a specific example. Embodiments with varying dimensions, materials and configurations compared to this example embodiment are possible. Some possible variations and related considerations are discussed below.

In this example embodiment, the length of the main section of containment chamber 100 may be chosen so that 93% of the neutrons emitted by target 102 may be absorbed in neutron-absorbing blocks 106. These blocks 106 may protect the structural material of containment chamber 100 from receiving a neutron fluence that may cause structural damage over time. The unprotected structural materials at the ends 101 of containment chamber 100 and the heat-exchanging pipes 114 may experience a neutron fluence of approximately $2.45 \times 10^{15}$ neutrons/cm$^2$ per shot. This neutron fluence can be increased or decreased at will by adjusting the length of containment chamber 100.

Similarly, the radius of containment chamber 100 can be increased or decreased to accommodate requirements of the neutron-absorbing blocks 106, or the shock-absorbing mounts 108. Note that any wall configuration can be used on the sides of containment chamber 100, and that the configuration involving blocks 106 and mounts 108 illustrated above is merely exemplary in nature. Alternate wall configurations may provide advantages for neutron and/or debris containment. Note that any change in the proportions of containment chamber 100 may require a corresponding change in the proportions of directional-radiation-output sleeve 103 in order for it to effectively shield the converter walls from target 102's prompt radiation output and direct the radiation output towards the heat-exchanging pipes 114.

The material and thickness of directional radiation output sleeve 103 may be varied. For some wall configurations, minimizing the total mass of target debris may be beneficial, and thus one may wish to use a sleeve 103 that is no thicker than the minimum required to protect the near wall from a damaging radiation fluence. In general, a dense, high-Z material may be advantageous for the sleeve, e.g., lead or tungsten. A radiation hydrodynamics simulation or experiment may be used to determine the thickness and material choice of sleeve 103 that best meet certain containment goals.

As an alternative to the use of the sleeve, target 102 may be constructed in such a manner as to produce directional output of radiation by nature of its design and inherent properties of its burn and disassembly. Certain techniques for accomplishing this are discussed in copending application Ser. No. 13/068,681, Robert O. Hunter Jr. et. al., filed May 17, 2011, entitled "*ICF Targets With Directional Output and Altered Output Spectrums*" which is incorporated herein by reference.

The number of pipes may be chosen to balance the expense and complexity of a large number of pipes with the need for a sufficiently large pipe surface area to keep the delayed radiation fluence to manageable levels. Additionally, the use of a large number of pipes may enable the use of pipes with a smaller wall thickness to contain the same gas pressures. The length of the pipes can be chosen in the same fashion, noting that, for a constant amount of energy that must be contained, a longer pipe provides a greater surface area, a reduced gas pressure, and may allow the use of a reduced gas density, while a shorter pipe may allow for a reduction in size of the entire system.

While nitrogen may be used in some embodiments, other gases can be used as well. A gas may be chosen in conjunction with the design of the gas injection system so that the density and opacity of the gas is such that the prompt radiation emitted from the target into pipes 114 is sufficiently absorbed in the gas to limit the prompt radiation fluence on the walls of the pipe to acceptable levels. In some embodiments, the number density of gas molecules may also be considered in order to ensure that there are a sufficient number of gas molecules to absorb most of the photons emitted by the target.

The geometry of the pipes 114 may also vary from the configuration discussed for some embodiments. The pipes may be of constant radius over their entire length, or they may be manufactured with increasing or decreasing radius. In particular, a pipe configuration with an expanding radius chosen such that the pipe wall may always be parallel to the radiation emitted by target 102 may be advantageous for some embodiments. In such a configuration, the only surface of the pipe wall that may be directly exposed to the prompt radiation output of target 102 will be the wall at the end of the pipe furthest from target 102. Embodiments may also involve "hybrid" pipe configurations, in which the pipe radius is variable over certain segments of the pipe, and constant in other segments.

Figure 4:
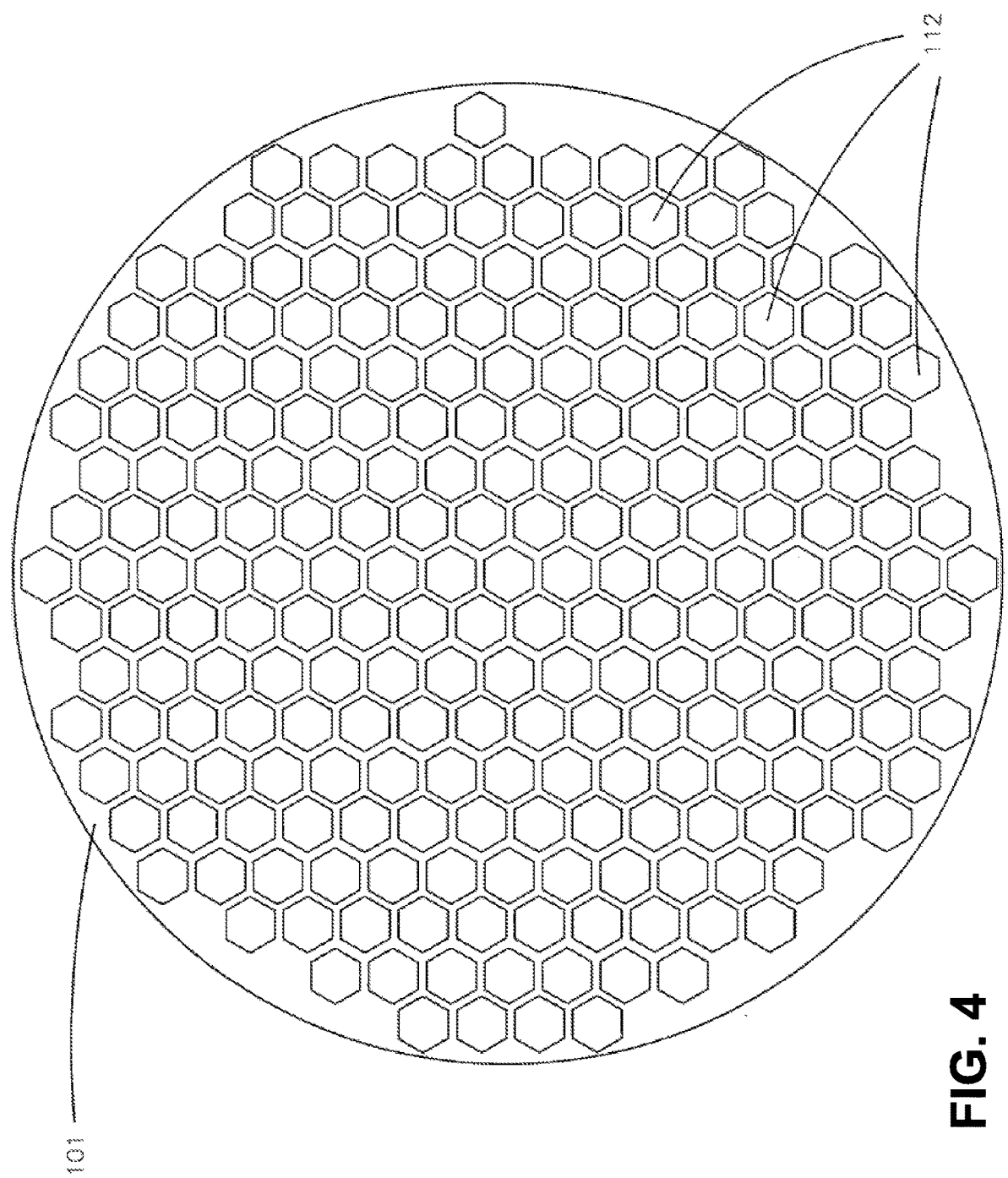
FIG. 4 illustrates a view of the end of a cylindrical containment chamber utilizing radiation containment pipes with a hexagonal cross-section, according to some embodiments.

The pipes need not be cylindrical. Rectangular pipes, or pipes with oval, triangular or other cross-sections may be used as well, and may provide advantages in certain embodiments (e.g. ease of manufacturing, ease of maintenance, efficient packing, etc.). In some embodiments, it may be desirable to minimize the surface area of the structural material at the ends 101 of containment chamber 100 between the holes 112, as this material will be directly subject to the prompt radiation flux from target 102. Pipes with hexagonal cross-section and using hexagonal holes 112 may be advantageous in this regard, as they can be efficiently packed or "tiled" together without any wasted space between the holes 112. FIG. 4 illustrates a cylinder end 101 with hexagonal holes 112. Other pipe cross-sections that may efficiently tile can be used as well. The pipes themselves can be constructed with a segmented or smoothly varying cross-section so that a pipe may be, for example, hexagonal in a segment closest to the containment chamber, yet still have a circular cross-section in the outer segment.

In some embodiments, the length and cross-section of the pipes, and/or the composition and density of the gas injected into them, may vary between pipes. These parameters may affect the amount of energy that each pipe can contain. By varying these parameters between pipes, one can create configurations that contain targets with non-uniform radiation output profiles, i.e. targets whose radiation output is not uniformly distributed over all pipes.

In some embodiments, an interlock system can be used to prevent the external drive mechanism from igniting the target if the gas injection system fails. This may be desirable to prevent damage to a pipes that might result from a target being fired without gas present in the pipe to absorb the prompt radiation output. The interlock system may include sensors along the length of each pipe that verify a minimum gas density has been achieved, e.g. optical or acoustic sensors. In some embodiments, neutron-absorbing blocks 106 may contain cooling channels, tritium-breeding materials, or other wall configurations known in the art.

Figure 5:
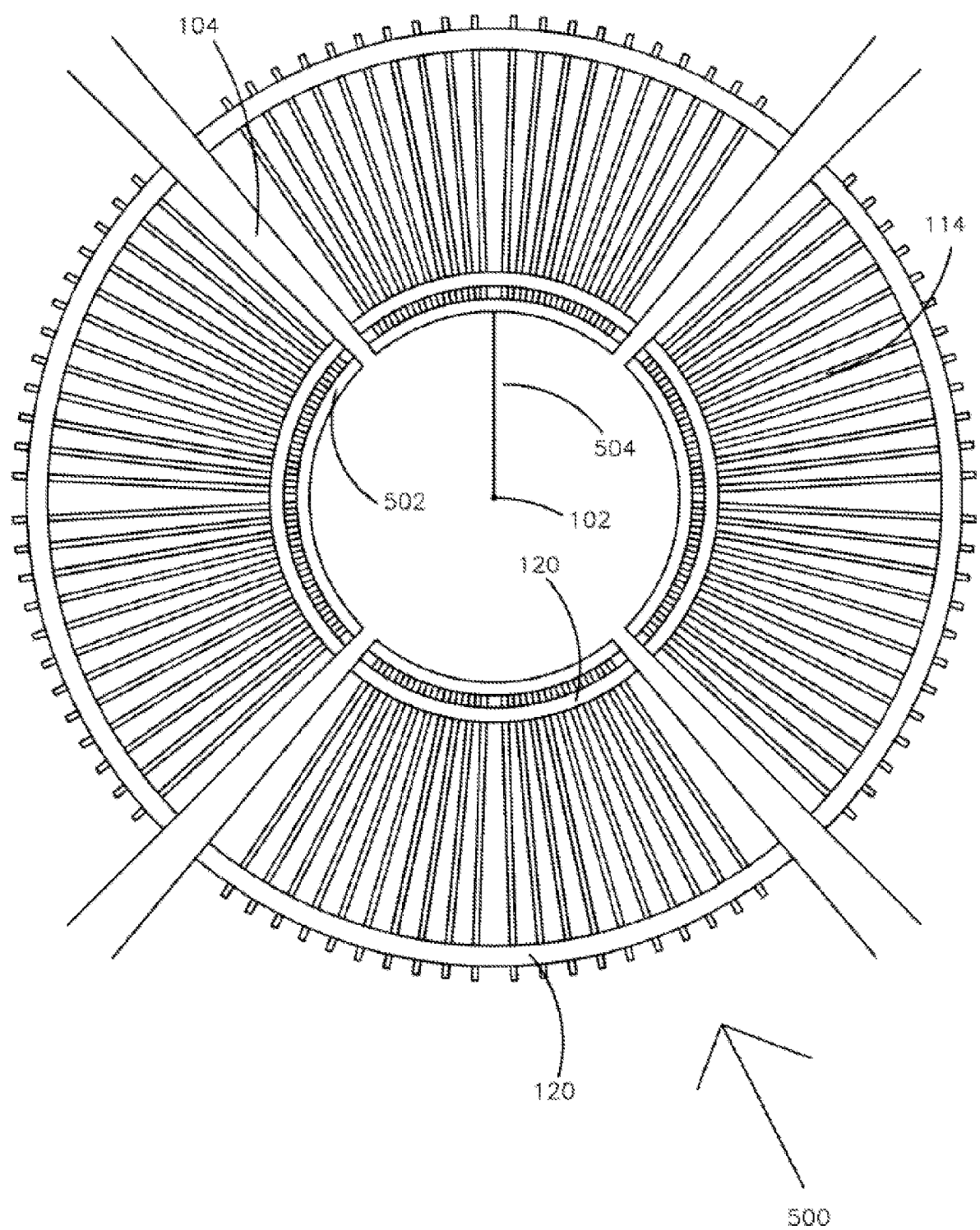
FIG. 5 illustrates a cross-section comprised of a spherical containment chamber with radiation containment pipes on all sides, according to some embodiments.

While some embodiments envision the use of a target that emits radiation outputs in two lobes in opposite directions along the same axis, some embodiments may contain targets that produce their radiation output in different patterns. For example, "aneutronic" targets utilizing fuels that produce small or negligible quantities of high-energy neutrons may naturally emit a larger fraction of their total yield as x-ray radiation, or may be specifically designed to emit as much yield in x-rays as possible. For containment of these targets, in which neutron and debris containment requirements may be negligible and x-ray containment may be the dominant restriction, a spherically symmetric containment chamber design such as that illustrated in the cross-section shown in FIG. 5 may be used. In this illustration, target 102 may be mounted in the center of spherical containment chamber 500, e.g. mounted by hanging from stalk 504 and aligned with beam entrance ports 104. Spherical containment chamber 500 is surrounded on all sides by gas containment pipes 114. The wall 502 of containment chamber 500 may include a series of holes connected to pipes 114, as in the preceding embodiments. Pipes 114 may utilize a cooling mechanism similar to that described above, including coolant manifolds 120, or any other means of cooling.

This class of embodiments may be intended to contain targets that emit most of their radiation in isotropic, non-directional radiation, and as such do not utilize the directional-radiation-output sleeve. Using the techniques and considerations discussed in this application, one may construct chambers to contain the x-ray output of targets that exhibit other symmetries or spatial distributions than those specifically mentioned here.

The set of embodiments discussed in this application is intended to be exemplary only, and not an exhaustive list of all possible variants of the invention. Certain features discussed as part of separate embodiments may be combined into a single embodiment. Additionally, embodiments may make use of various features known in the art but not specified explicitly in this application.

Embodiments can be scaled-up and scaled-down in size, and relative proportions of components within embodiments can be changed as well. The range of values of any parameter (e.g. size, thickness, density, mass, etc.) of any component of an embodiment of this invention or of entire embodiments in this application should not be construed as a limit on the maximum or minimum value of that parameter for other embodiments, unless specifically described as such.

What is claimed is:

1. A confinement chamber for Inertial Confinement Fusion (ICF), the chamber comprising:
   a chamber wall comprising a plurality of holes, wherein the holes are positioned to receive x-ray radiation from an ICF target containing nuclear fusion fuel;
   a plurality of pipes coupled to the plurality of holes and radiating outward and perpendicular-to the chamber wall, wherein each of the plurality of pipes has the substantially same cross-sectional shape along a common length of each of the plurality of pipes; and
   a plurality of gas injection nozzles coupled to the plurality of pipes, wherein the plurality of gas injection nozzles are configured to deposit a gas into the plurality of pipes prior to the activation of an external drive mechanism operable to deliver energy to compress the ICF target.

2. The chamber of claim 1, wherein the plurality of pipes radiate outward from the chamber wall in a direction that is parallel with a direction of the x-ray radiation from the ICF target.

3. The chamber of claim 1, wherein the gas comprises nitrogen.

4. The chamber of claim 1, further comprising a directional output sleeve configured to direct the x-ray radiation from the ICF target towards the plurality of holes.

5. The chamber of claim 1, wherein the chamber wall is cylindrical with two rounded ends, wherein the plurality of holes are located on the two rounded ends.

6. The chamber of claim 1, wherein the plurality of holes and the plurality of pipes have a hexagonal cross-section.

7. The chamber of claim 1, wherein the plurality of pipes have a cross-section with a varying radius along the length of each of the plurality of pipes.

* * * * *